United States Patent [19]

Stevenson

[11] Patent Number: 4,844,686

[45] Date of Patent: * Jul. 4, 1989

[54] COLLATING APPARATUS

[75] Inventor: Clarence L. Stevenson, Saint Helena, Calif.

[73] Assignee: Colmac, Inc., Napa, Calif.

[*] Notice: The portion of the term of this patent subsequent to Apr. 25, 2006 has been disclaimed.

[21] Appl. No.: 80,912

[22] Filed: Aug. 3, 1987

Related U.S. Application Data

[63] Continuation-in-part of Ser. No. 869,360, Jun. 2, 1986, Pat. No. 4,824,306.

[51] Int. Cl.⁴ ............................................. B65G 60/00
[52] U.S. Cl. ................... 414/788.4; 221/95; 221/112; 414/789.6; 414/794.7; 414/797.9; 414/928
[58] Field of Search ............... 198/420, 421, 422; 221/93, 95, 112; 414/29, 32, 41, 89, 102, 131, 786

[56] References Cited

U.S. PATENT DOCUMENTS

| | | | |
|---|---|---|---|
| 2,781,887 | 2/1957 | Forster | 198/422 X |
| 2,853,177 | 9/1958 | Engleson et al. | 198/421 |
| 3,160,315 | 10/1963 | Bailey | 221/93 |
| 3,220,158 | 11/1965 | Roser et al. | 414/89 X |
| 3,288,331 | 11/1966 | Mazurkivich | 221/93 X |
| 4,068,766 | 1/1978 | Schmitt | 198/420 X |
| 4,397,599 | 8/1983 | Sabel | 414/98 X |

FOREIGN PATENT DOCUMENTS 431081 4/1975 U.S.S.R. ............................ 414/51

Primary Examiner—Robert J. Spar
Assistant Examiner—Janice Krizek
Attorney, Agent, or Firm—Douglas E. White

[57] ABSTRACT

In a stacking apparatus of the type having tines for pushing one workpiece out of each of the bottoms of a plurality of aligned reservoirs, an improvement is disclosed which comprises a ramp adjacent to the reservoirs and inclined with respect to the bottom line of the reservoirs for stacking the workpieces in stacks of increasing height.

13 Claims, 5 Drawing Sheets

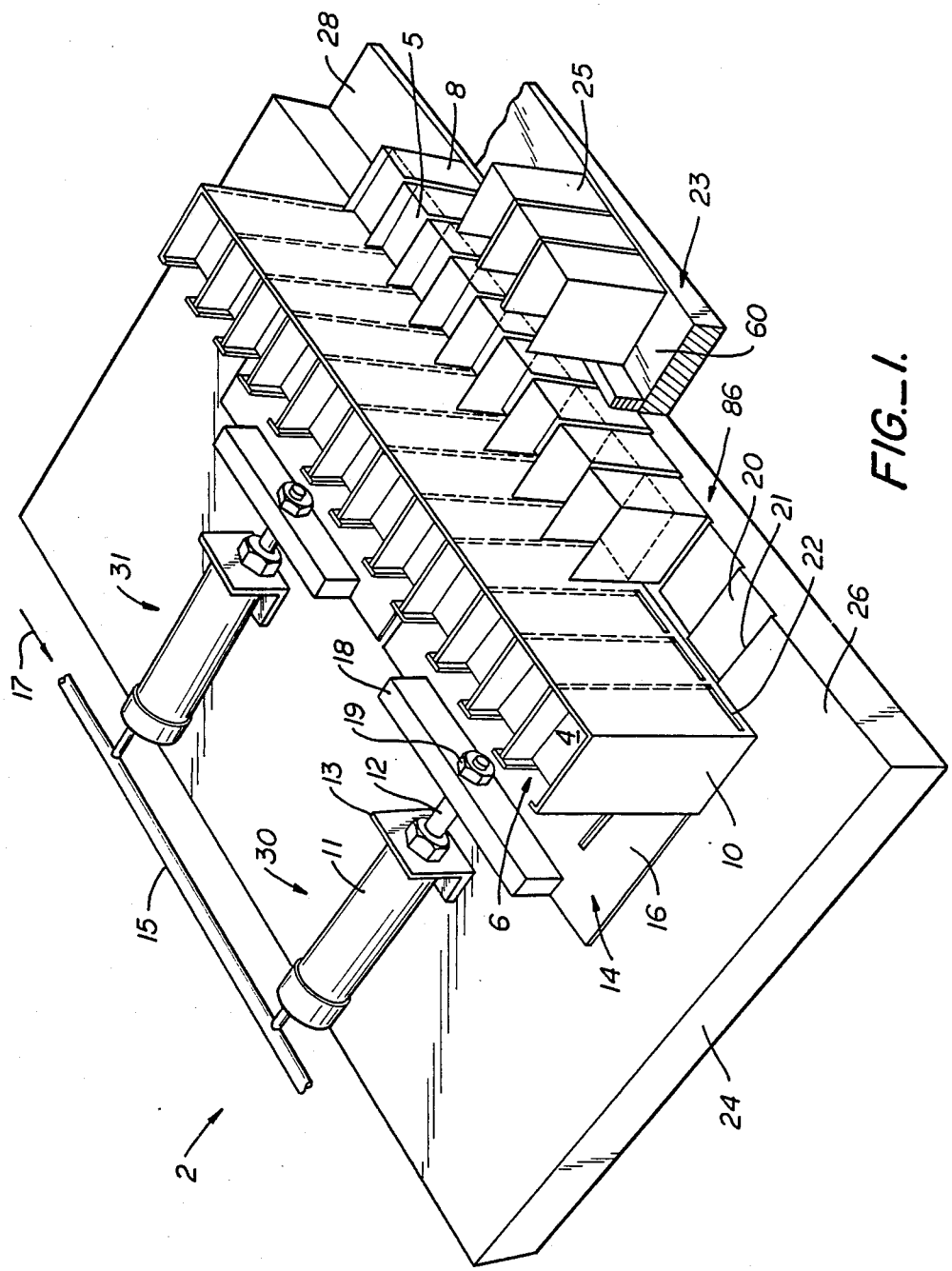
FIG._1.

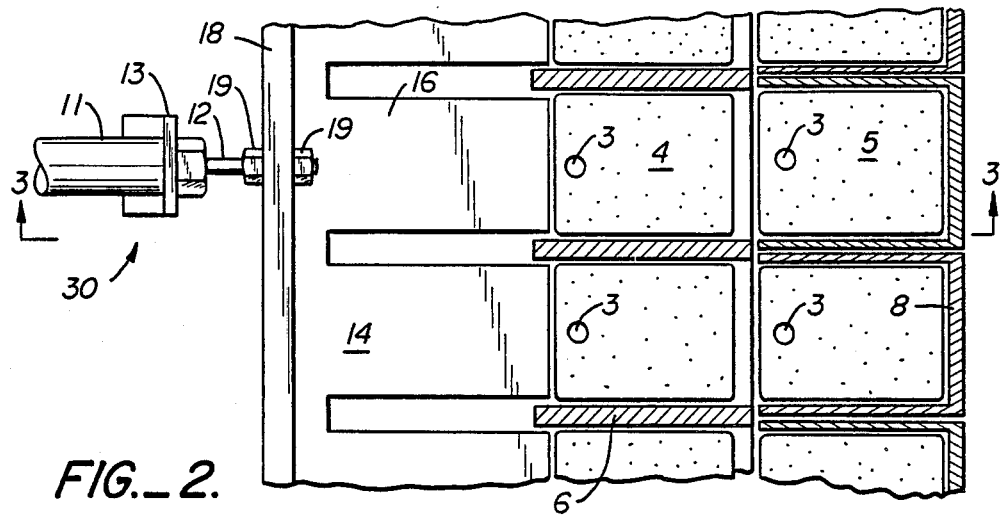
FIG._2.
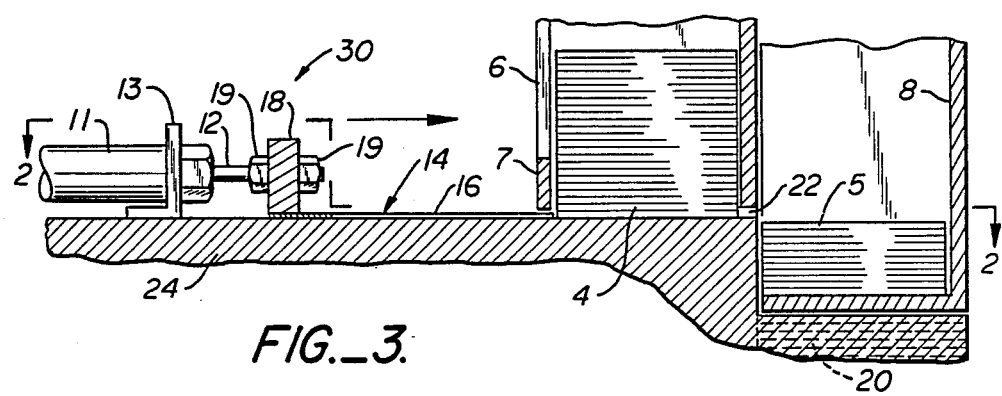
FIG._3.
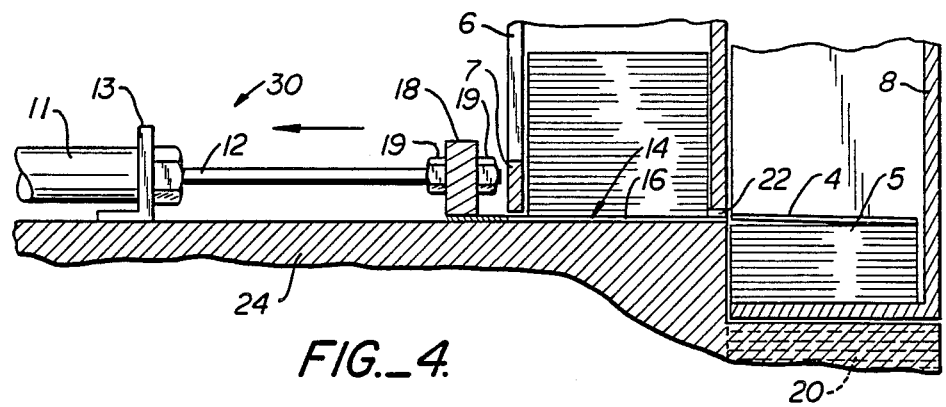
FIG._4.

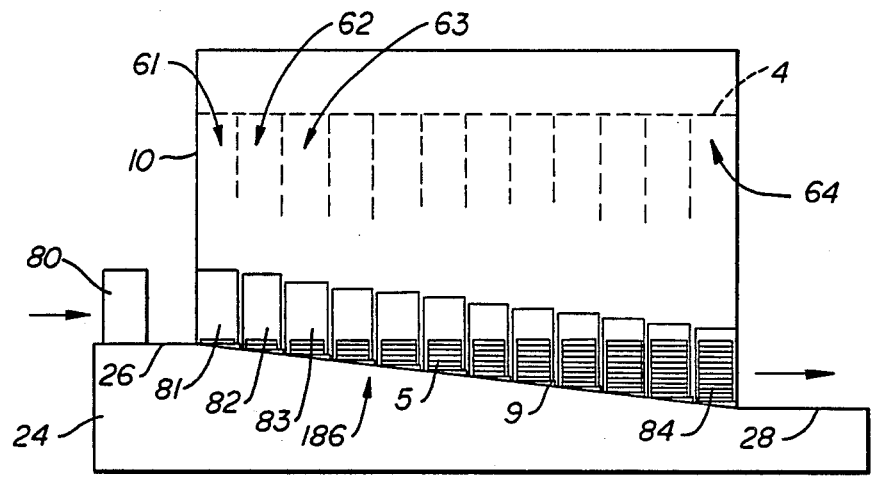
FIG._5.
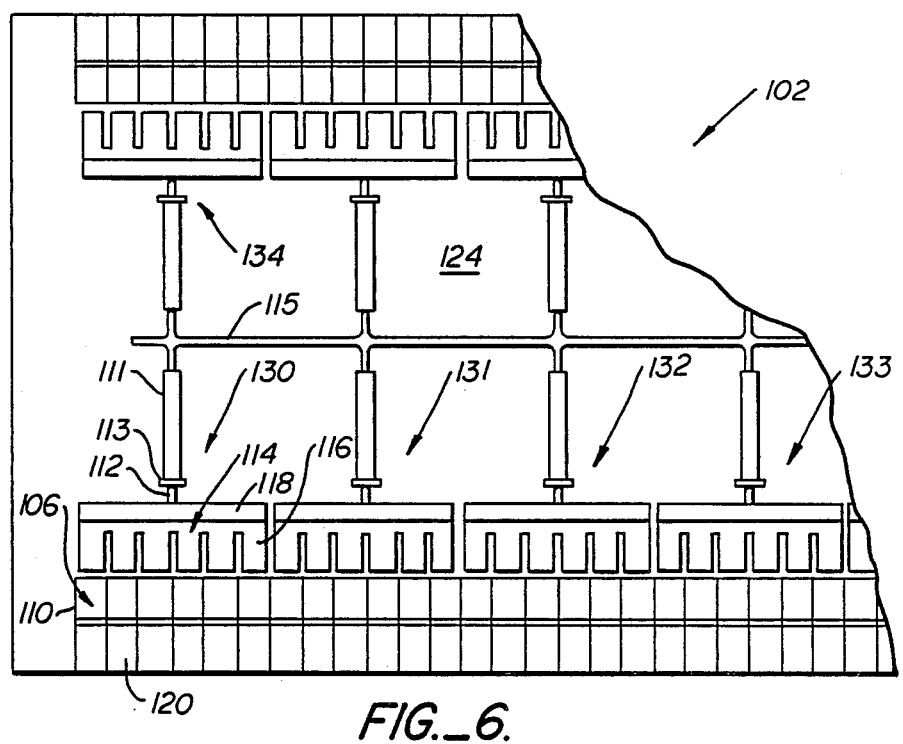
FIG._6.

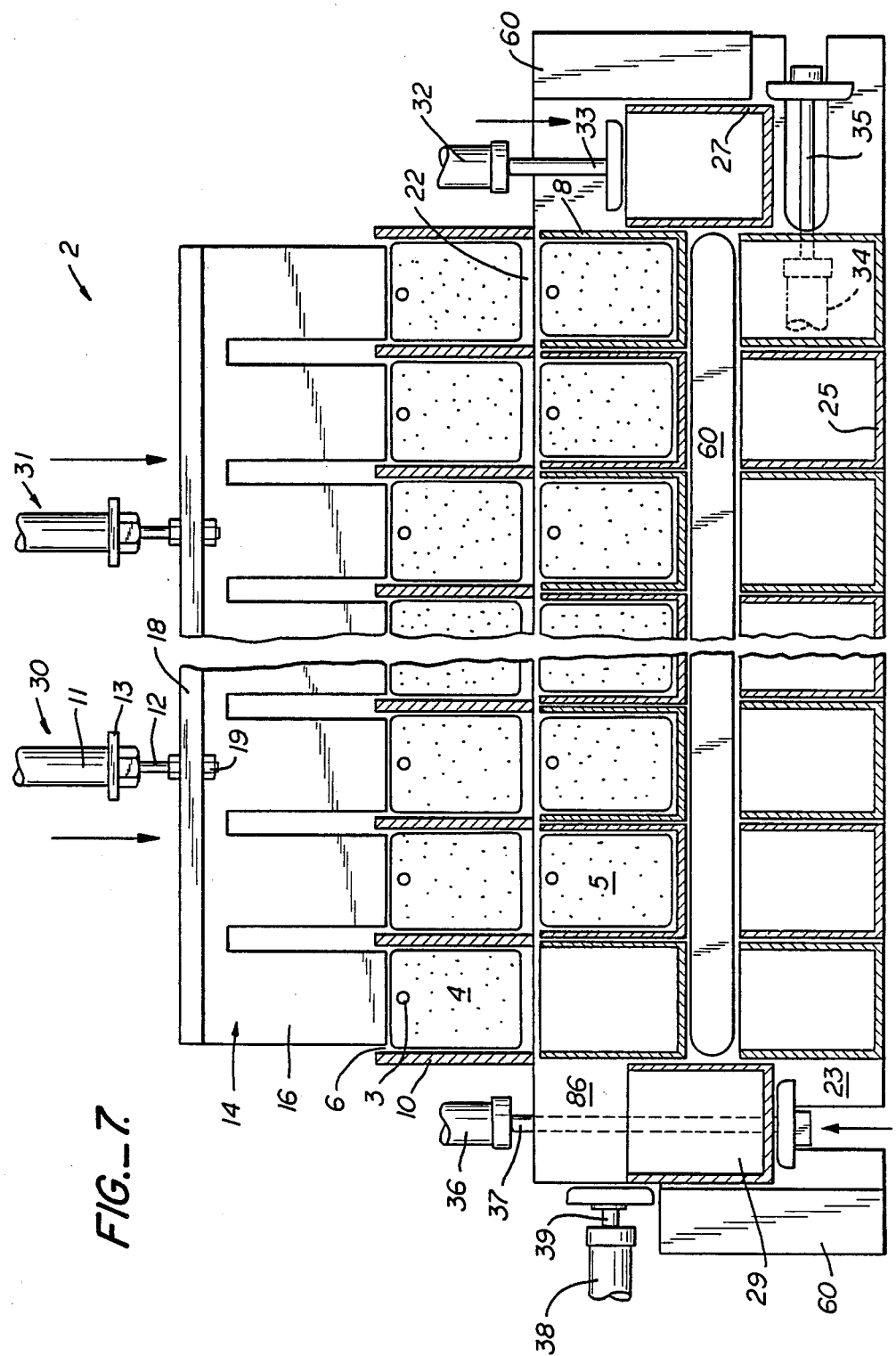
FIG._7.

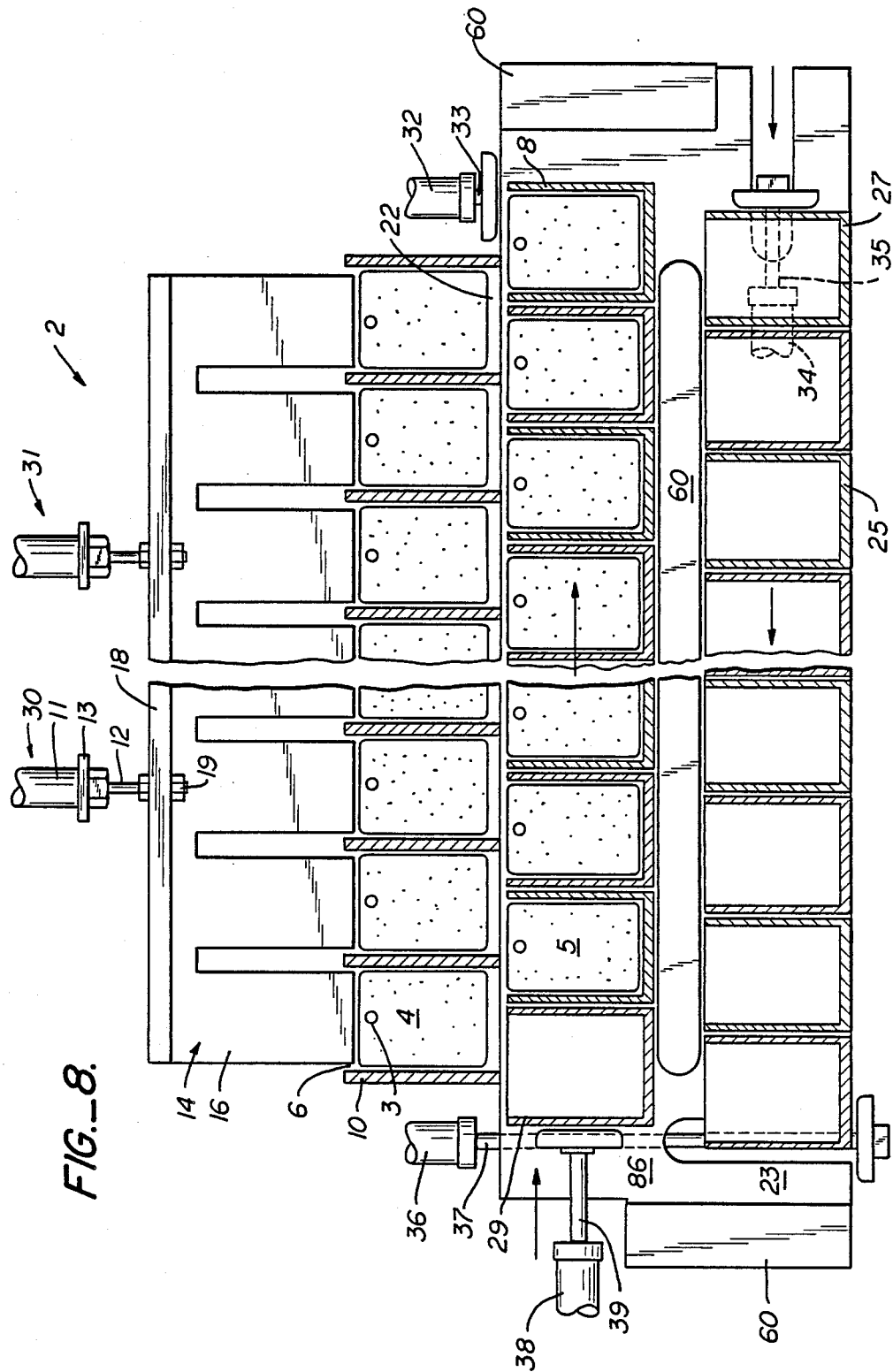
FIG._8.

COLLATING APPARATUS

RELATED APPLICATION

The present application is a continuation-in-part of applicant's application Ser. No. 06/869,360, filed June 2, 1986, entitled "Collating Apparatus," now U.S. Pat. No. 4,824,306.

FIELD OF THE INVENTION

This invention relates to automatic machinery for sorting and stacking planar workpieces—more particularly, to apparatus for collating laminated plastic sample chips.

BACKGROUND OF THE INVENTION

Laminated plastic building material, such as that available under the trademark FORMICA, is usually sold in large sheets, four feet by eight feet being one common size. In view of the difficulty purchasers have in perusing through selections of such sheets, which may be available in hundreds of different colors and patterns, laminated plastic is commonly selected for purchase through the use of chain loops of small samples ("chips") of the available stock.

Sample chip loops are compact and lightweight. They are cheaply transportable by the manufacturer, easily restocked with new selections and can be taken home by the prospective purchaser for on-site comparison with the intended decor. Insofar as stock may be ordered for delivery from the manufacturer or from a central warehouse through the use of stock numbers printed on the chips, such sample loops can reduce the need for the retailer to keep a complete stock of expensive inventory.

Chip loops consist of scores of small pieces of laminated plastic, each typically about 2 inches by 3 inches, through which a conventional ball link chain (key chain) passes. The prior art method of assembling such loops has been to manually select one chip at a time from consecutive bins each containing chips of like color, pattern, composition or the like. Each succeeding chip is placed on top of the last, forming a collated stack of differing color, pattern, etc.

Each chip is pierced by a round hole of significantly greater diameter than the balls of the ball link chain. The loop is assembled by dropping the chain through the cylindrically aligned holes of the stack, lifting the stack and then securing the ends of the chain together.

U.S. Pat. No. 2,872,020 to O. Hansel et al. teaches a stacking apparatus for planar objects which could be converted for limited use to automatically form laminate plastic sample chip stacks. However, the Hansel apparatus is only capable of forming stacks of a height which is limited by the height of vertical tines—the stack can be no higher than the tines, whose height is in turn limited by the torque which a revolving conveyor chain can support. Thus, there is a need in the art for an automatic stacking apparatus which can collate and stack scores, if not hundreds, of laminate chips for forming into sample loops.

SUMMARY OF THE INVENTION

The present invention is a stacking apparatus having tines for pushing one workpiece each out of the bottoms of a plurality of aligned reservoirs and which has receiver advance ramp means adjacent to the reservoirs and inclined with respect to the bottom line of the reservoirs for stacking the workpieces in stacks of increasing height.

FEATURES AND ADVANTAGES

An object of this invention is to provide an automatic stacking apparatus which can collate and stack laminate plastic sample chips for forming into loops for use by customers in the selection of laminate plastic sheets for purchase. This is accomplished by an apparatus which uses a fork-like tine of a plate containing a plurality of such tines to push a chip from the bottom of a reservoir onto the top of a chip stack in a receiver container.

Another object of the present invention is to provide a collating apparatus which can form stacks of very large height—stacks of up to at least 48 chips in height, which stacks can be combined to form stacks of even greater height. Banks of the chip reservoirs can be sequentially arranged in a line and in the present mechanism the height (number of chips) of the chip stacks is not limited by the length of the tines. Theoretically, it is not limited at all—for each new color or pattern of chip, a new reservoir can by added to the line. Receivers can be half filled by one bank of reservoirs and then transported to a second bank for completion of collation. Alternatively, one set of stacks of a certain height can be formed and set aside. The reservoirs can then be filled with different chips and a second set of stacks formed. The two stack sets can then be combined to form a set of stacks of double height.

Yet another object is to be able to form multiple collated stacks in continuous succession. A plurality of chip receivers passes by the reservoirs of the instant apparatus. The number of stacks is limited only by the supply of chips in the reservoirs, which supply can be continuously refreshed.

Yet another advantage of the present invention is that the chip receivers are independent modules which can be transported, manually or by separate apparatus, to a working area for insertion of the chain loop. The receivers are shaped to form an even stack with aligned chain holes and to keep the stack stable in the desired shape during movement of the stack.

Still another advantage is that the sequence of chips within the formed loop can be varied merely by selecting the order of chip lots as they are placed within the reservoirs.

Another advantage is that a return ramp may be provided which automatically returns empty receivers back to the first reservoir in order that they may be continuously refilled.

It is also an advantage that the receiver advance ramp either may be stepped in the manner of stairs or may be smoothly inclined.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWING

FIG. 1 is a perspective view of the collating apparatus of the present invention showing two injectors;

FIG. 2 is a sectional view of the collating apparatus of FIG. 1 taken along line 2—2 of FIG. 3, showing a portion of an injector and two reservoir bottoms;

FIG. 3 is a sectional view of the collating apparatus of FIG. 1 taken along line 3—3 of FIG. 2;

FIG. 4 is a sectional view of the collating apparatus of FIG. 3 showing the injector in a second position;

FIG. 5 is a schematic elevational view of the collating apparatus of FIG. 1 showing a smoothly inclined advance ramp;

FIG. 6 is a part schematic, part sectional plan view of a collating apparatus of which the apparatus of FIG. 1 forms one portion;

FIG. 7 is a part sectional plan view of the apparatus of FIG. 1 in a first position; and FIG. 8 is a sectional plan view of the apparatus of FIG. 7 in a second position.

DESCRIPTION OF THE PREFERRED EMBODIMENT

Referring to FIG. 1, there is shown therein a collating apparatus generally designated as 2. In this embodiment there are illustrated two injectors 30,31. In another preferred embodiment wherein a chain loop of chip samples of more than twelve chips is desired, additional injectors may be added, both in line with injectors 30,31 and directly opposite them.

The embodiment illustrated will be described with respect to the operation of injector 30. The parts of injector 31 and any additional injectors are identical in form and function.

Injector 30 comprises an air cylinder 11 which translates pneumatic piston 12 as air 17 is introduced or removed from air line 15. Piston 12 is connected to plate 14 by fitting 18. Fitting 18 is welded or otherwise affixed to plate 14. A threaded end of piston 12 is secured to fitting 18 by nut 19, but other equivalent methods of securing piston 12 to plate 14 may easily be devised.

Plate 14 has projecting fork-like planar tines 16 which are inserted into the bottom of dispenser 10. Dispenser 10 consists of a row of at least six vertically and horizontally aligned hoppers or chip reservoirs 6. The shape of the tines 16 (rectangular) is the same as that of the cross-section of the interior of the reservoirs 6, but the size of the tines 16 is slightly smaller in order to allow easy ingress and egress of the tines to the reservoirs 6. Reservoirs 6 are each filled with chips, generally designated 4. While the chips 4 in any one reservoir 6 are all of one identical color, pattern or composition, each separate reservoir 6 holds chips 4 of a different color, etc. than the others.

It is desired to distribute the chips initially stacked by single attribute in the reservoirs 6 into stacks 5 of chips which contain one chip from each reservoir, i.e. are collated into stacks where no two chips are of identical attribute. This is accomplished by tines 16 of plate 14 which push chips 4 out of the bottoms of reservoirs 6 one at a time into a line of awaiting receivers, generally designated 8.

Receivers 8 are orthogonal sextahedrons having an open top for unloading collated chips 5 and one open side for receiving uncollated chips 4 from the reservoirs 6. Receivers 8 are of a height at least equal to that of the maximum stack 5 obtainable from the number of reservoirs 6 in the dispenser 10. In FIG. 1 that stack is twelve chips in height, resulting from one chip from each of the twelve reservoirs 6. An effective apparatus may be built containing 96 or more reservoirs, and a section of such a machine is shown in FIG. 6.

Injector 30 is mounted on a housing or platform 24 by bracket 13. Platform 24 has twelve steps 20 forming receiver advance ramp 86 descending in a straight line immediately in front of the face of dispenser 10. Each step 20 is lower that its predecessor by a height at least equal to the thickness of a standard laminate chip sample 4. In other words, the risers 21 of steps 20 each equal the height of a chip 4. An optional staging area 26 may be located on the platform 24 adjacent the dispenser 10 and before the first step 20. A similar optional holding area 28 for full receivers 8 may be located at the end of the step ramp of the platform 24.

In another preferred embodiment, best seen in FIG. 5, the advance ramp 186 is a smooth inclined plane rather than being stepped. In this embodiment, the plane is inclined with respect to the plane of slots 22 to the extent that it drops a vertical distance equal to the thickness of a chip for each horizontal distance equal to the width of a receiver 8. In other words, the slope of smooth advance ramp 186 is substantially equal to the thickness of a chip divided by the width of a receiver.

FIG. 1 shows the first three steps 20 empty, for purposes of illustrating the location and configuration of slots 22 and steps 20. Slots 22 are aligned across the face of dispenser 10 and are of a shape and size which will allow the passage of only one chip 4 at a time from each reservoir 6 into an associated receiver, one of which is located opposite each slot 22 on each step 20 during actual operation.

A smoothly inclined receiver return ramp 23 of slope equal to the slope of advance ramp 86 allows empty receivers, generally designated 25, to return from the last reservoir to the first reservoir, in order that the receivers may be continuously refilled. Ramp 23 is not necessary in all embodiments of the apparatus, as the receivers may be returned manually, and ramp 23 is omitted for clarity from FIGS. 2-6. Automatic return operation is explained in the discussion of FIGS. 7 and 8 below.

Referring to FIG. 2, there is shown therein a top view in partial section of the collating apparatus 2 of FIG. 1. Piston 12 is retracted into cylinder 11 and tines 16 of plate 14 are nearly completely removed from the reservoir bays 6. Chip 4 shown in FIG. 2 is the lowermost chip in the stack in the reservoir 6. Also shown in FIG. 2 is the round aperture or hole 3 which pierces chips 4 and is used to insert a ball link chain (not illustrated) in the final stage of assembly of a chip sample loop.

The position shown in the top view of FIG. 2 is repeated in the side view of FIG. 3 and represents the position of the injector 30 preparatory to injecting bottom chip 4 through slot 22 onto the top of chip stack 5. An increase in pressure of air 17 will cause piston 12 to move from the position shown in FIG. 3 to that shown in FIG. 4. The piston 12 then extends outwardly from cylinder 11 and moves tine 16 of plate 14 into reservoir 6. Tine 16 contacts lowermost chip 4 and ejects it onto the top of stack 5 of the receiver 8 which is at that point in time opposite the reservoir 6 illustrated in FIGS. 3 and 4. The restricted height of slot 22 ensures that only one chip exits a reservoir per piston stroke. To complete the stroke, piston 12 retracts back into its cylinder 11 and is ready for the next cycle. Piston 12 can be made to retract either by the application of a vacuum or through use of a spring loaded cylinder 11 which automatically retracts when air pressure is reduced below the point required to overcome the spring's resistance.

The complete cycle of operation of collating apparatus 2 can be explained with reference to FIG. 5 in addition to the figures of the drawings already mentioned. Prior to automatic operation, the apparatus 2 must be primed as follows. An empty receiver 81 is placed on inclined receiver advance ramp 186 opposite the first reservoir 61 of dispenser hopper 10 (note that receiver 81 is not shown empty in FIG. 5 because that Figure illustrates the status following the first stroke). A single chip of the type contained in the first reservoir 61 is placed in a second receiver 82 and receiver 82 is placed in position on ramp 186 opposite the second reservoir 62. A chip of the type contained in the first reservoir 61 is placed on the bottom of a third receiver 83 and a chip of the type contained in the second reservoir 62 is placed on top of this bottom chip. Third receiver 83 is then placed opposite third reservoir 63. Loading of the remaining receivers proceeds in the same manner, i.e. each receiver is given a stack containing chips of types from all preceding reservoirs, but is not given a chip from the reservoir opposite from which it is to be placed prior to the start of automatic operation. In this manner, final receiver 84, number twelve in the embodiment illustrated in FIG. 5, is primed with chips of the types found in the eleven preceding reservoirs, is placed opposite the last (twelfth) reservoir 64, and is ready to receive a chip from its associated reservoir, as are all of the other receivers 81,82,83...

The apparatus is activated by the first pump of air, causing one chip per receiver to be ejected simultaneously into the twelve receivers 81,82,83 . . . 84. FIG. 5 illustrates the status of the receivers immediately following this first stroke. At this point, an empty receiver 80 is introduced from staging area 26 of platform 24 by pushing it, either manually or through automatic operation, against receiver 81. This forces receiver 81 to slide down ramp 186 (or drop down a step 20 in the case of a stepped advance ramp 86 as shown in FIGS. 1-4) into position opposite reservoir 62, receiver 82 to slide opposite reservoir 63 and so on. Receiver 84, now full, is forced onto the holding area 28. The stack 5 of chips thus collated in final receiver 84 is removed, a ball link chain inserted in the aligned apertures 3 of the chip stack and the ends of the chain linked together in the manner known in the art (not illustrated).

In the embodiment having a smoothly inclined ramp 186 as shown in FIG. 5, it may be advantageous to add a bevelled wedge 9 to the bottom of each receiver in order that the receivers remain vertical while advancing down ramp 186. However, this is not necessary, except perhaps in the case of extremely long banks of reservoirs, due to the very small slope of ramp 186 (shown exaggerated in the drawing for purposes of illustration).

FIG. 6 is a sectional view of another preferred embodiment 102 of the invention in which a battery of sixteen or more injectors 130,131,132,133,134 . . . may be assembled on platform 124. In this embodiment, no staging area is provided. Injector 130 is comprised of cylinder 111, piston 112, bracket 113, plate 114, six tines 116 and fitting 118. Tines 116 feed into reservoirs 106 of dispenser 110. Steps 120 are provided for individual receivers (not illustrated). Injectors 131, 132, . . . are similarly configured and operate in the manner previously described. An important feature in the operation of collating apparatus 102 is that injector 130 is opposite and its center line is aligned with the center line of injector 134, both perpendicular to the axis of air line 115, and all other injectors 131,132,133 . . . are similarly paired. In this manner, each stroke of a piston, e.g. piston 112 of injector 130, is counterbalanced by a simultaneous opposing stroke of the piston of the paired injector, e.g. injector 134. Torque forces, which otherwise might stress and eventually fracture tube 115 are thus avoided. Once a receiver has passed by all the reservoirs 130,131 . . . of the first row, it is carried to the beginning of the second opposite row where it is filled by reservoirs 134 . . . to complete the collation.

Referring to FIGS. 7 and 8, the automatic receiver return feature of the invention is therein illustrated. Receivers, generally designated 8, advance down stepped ramp 86 (or inclined ramp 186) as they fill with stacks of collated chips 5. Empty receivers, generally designated 25, return up inclined ramp 23.

In FIG. 7, receiver 27, having been completely filled and then emptied in place (either manually or by further automatic operation) is being pushed by piston 33 of pneumatic cylinder 32 into position on empty receiver return ramp 23. Meanwhile, empty receiver 29 has returned to the top of ramp 23 and is being pulled by a return stroke of piston 37 of cylinder 36 onto the top of advance ramp 86. Fixed guides 60 separate receivers and channel them in set directions during motion. Concurrently (i.e. at some time before the cycle shown in FIG. 8), sample chips 4 are ejected onto collated chip stacks 5 by pneumatic injector cylinders 30,31.

The second cycle of the two cycle receiver advance and return process is shown in FIG. 8. Empty receiver 27 is pulled up return ramp 23 by a return stroke of piston 35 of pneumatic cylinder 34. This, in turn, returns all empty receivers 25 up the ramp one position. Meanwhile, empty receiver 29 is pushed in front of the first reservoir of dispenser 10 and is ready to receive the first chip 4 with the next stroke as described with reference to FIG. 7. This action also advances all receivers 8 on ramp 86 (or ramp 186) by one position. After this stroke the last receiver (now opposite cylinder 32) is full and will have its stack 5 removed before repeating the process.

While the above provides a full and complete disclosure of the preferred embodiments of this invention, various modifications, alternate constructions, and equivalents may be employed without departing from the true spirit and scope of the invention. Therefore, the above description and illustrations should not be construed as limiting the scope of the invention which is defined by the appended claims.

I claim:

1. In a stacking apparatus of the type having tines for ejecting one workpiece out of each of the bottoms of a plurality of aligned substantially vertical reservoirs, the improvement comprising:

advance ramp means adjacent to the reservoirs and inclined with respect to a substantially horizontal bottom line of the reservoirs for stacking the workpieces in substantially vertical stacks of increasing height;

a plurality of orthogonal sextahedrons on the advance ramp means for enclosing the vertical stacks of workpieces, each sextahedron having an open top and one open side;

first and second positions on opposite ends, respectively, of the advance ramp means;

means for advancing the sextahedrons down the advance ramp means from the first position to the second position; and smooth inclined return ramp means, adjacent to the advance ramp means, for returning the sextahedrons from the second position to the first position.

2. In a stacking apparatus of the type having tines for ejecting one workpiece out of each of the bottoms of a plurality of aligned substantially vertical reservoirs, the improvement comprising:

a stairway adjacent to the reservoirs inclined with respect to a substantially horizontal bottom line of the reservoirs for stacking the workpieces in substantially vertical stacks of increasing height;

receiver means on the inclined stairway for enclosing the vertical stacks of workpieces;

a plurality of steps on the stairway, the steps having risers of height at least equal to the height of the workpieces, wherein the workpieces are stacked in the receiver means in stacks whose height increases by the height of one workpiece per step;

a slot in the bottom of each reservoir aligned with the horizontal bottom line of the reservoirs;

pneumatic means for pushing the tine against the workpieces in the bottoms of the reservoirs, whereby one workpiece per reservoir is ejected from each slot;

first and second positions on opposite ends, respectively, of the inclined stairway;

means for advancing the receiver means down the inclined stairway from the first position to the second position; and smooth inclined return ramp means, adjacent to the inclined stairway, for returning the receiver means from the second position to the first position.

3. The stacking apparatus of claim 2 wherein the penumatic means is at least one pneumatic piston in a pneumatic cylinder, the piston being connected to a plurality of the tines.

4. The stacking apparatus of claim 3 wherein the tines are planar and the piston is connected to the tines by a plate, the plate and tines forming the shape of a fork.

5. A stacking and collating apparatus for planar workpieces comprising:

a platform frame;

at least six vertical reservoirs for the workpieces aligned in a row on the frame, the row of reservoirs having a first side and a second side opposite the first side, the first side having a slot at the bottom of each reservoir, the slots aligned on a center line parallel with the plane of the frame;

at least one plate, the plate having a plurality of planar tines extending from a first end of the plate, one tine inserted in slidable enagement in the bottom of each of the reservoirs through an opening in the second side of the row of reservoirs;

means for slidably engaging and disengaging the tines with the interiors of the reservoirs, whereby the tines discharge workpieces through the slots;

a plurality of receiving container for the workpieces;

advance ramp means inclined at an angle and extending downwardly with respect to the center line of the slots and the plane of the platform frame and adjacent to the first side of the row of reservoirs for aligning the receiving containers in descending order adjacent to the slots;

first and second positions on opposite ends, respectively, of the advance ramp means;

means for advancing the receiving containers down the advance ramp means from the first position to the second position; and smooth inclined return ramp means, adjacent to the advance ramp means, for returning the receiving containers from the second position to the first position.

6. The apparatus of claim 5 wherein the means for slidably engaging and disengaging the tines with the interiors of the reservoirs is at least one pneumatic piston in at least one pneumatic cylinder, the piston being connected to the at least one plate at a second end of the plate opposite the tines of the first end of the plate, whereby air fed to the cylinder causes the tines to engage with the reservoirs and eject one workpiece per reservoir through the slot of the reservoir into the receiving container adjacent to the reservoir.

7. The apparatus of claim 6, wherein the advance ramp means is an inclined stairway.

8. The apparatus of claim 7, wherein the stairway has a plurality of steps, the steps having risers of height at least equal to the height of a workpiece, wherein the workpieces are stacked in the receiving containers in stacks whose height increases sequentially by the height of one workpiece per step.

9. The apparatus of claim 8, wherein there are 16 pistons connected to 16 plates, each plate having 6 tines, for a total of 96 tines engaged in 96 reservoirs.

10. The apparatus of claim 9, wherein eight of the pistons have their axes in line with axes of the other eight pistons, forming eight pairs of directly opposing pistons, whereby air supplied to the cylinders of the pistons does not create torque forces.

11. The apparatus of claim 10, wherein the workpieces are laminated plastic chip samples.

12. A stacking and collating apparatus for planar workpieces comprising:

a platform frame;

at least six vertical reservoirs for the workpieces aligned in a row on the frame, the row of reservoirs having a first side and a second side opposite the first side, the first side having a slot at the bottom of each reservoir, the slots aligned on a center line parallel with the plane of the frame;

at least one plate, the plate having a plurality of planar tines extending from a first end of the plate, one tine inserted in slidable engagement in the bottom of each of the reservoirs through an opening in the second side of the row of reservoirs;

means for slidably engaging and disengaging the tines with the interiors of the reservoirs, whereby the tines discharge workpieces through the slots;

a plurality of receiving containers for the workpieces; and a smooth inclined plane whose slope is substantially equal to the height of a workpiece divided by the width of a receiving container, the inclined plane inclined at an angle and extending downwardly with respect to the center line of the slots and the plane of the platform frame and adjacent to the first side of the row of reservoirs for aligning the receiving containers in descending order adjacent to the slots.

13. The apparatus of claim 12, wherein the workpieces are laminated plastic chip samples.

* * * * *